(12) United States Patent
Nachenberg

(10) Patent No.: US 9,253,010 B1
(45) Date of Patent: Feb. 2, 2016

(54) SYSTEMS AND METHODS FOR DETERMINING A REPUTATION OF AT LEAST ONE TELEPHONE NUMBER ASSOCIATED WITH AN UNCLASSIFIED SOURCE

(75) Inventor: Carey Nachenberg, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 454 days.

(21) Appl. No.: 12/967,833

(22) Filed: Dec. 14, 2010

(51) Int. Cl.
*H04L 29/06* (2006.01)

(52) U.S. Cl.
CPC ..................... *H04L 29/06* (2013.01)

(58) Field of Classification Search
CPC ........................................ H04L 51/10
USPC ......................... 709/224; 379/210
See application file for complete search history.

(56) References Cited

U.S. PATENT DOCUMENTS

| | | | |
|---|---|---|---|
| 2004/0205135 A1* | 10/2004 | Hallam-Baker | 709/206 |
| 2006/0182029 A1* | 8/2006 | Kealy et al. | 370/230 |
| 2008/0298575 A1* | 12/2008 | Rondeau et al. | 379/211.01 |
| 2009/0307320 A1* | 12/2009 | Golan et al. | 709/206 |
| 2010/0082828 A1* | 4/2010 | Jennings et al. | 709/229 |
| 2010/0246795 A1* | 9/2010 | Saha et al. | 379/210.02 |
| 2011/0201320 A1* | 8/2011 | Wosk et al. | 455/415 |
| 2012/0027191 A1* | 2/2012 | Baril et al. | 379/210.02 |
| 2012/0027197 A1* | 2/2012 | Zgardovski et al. | 379/266.07 |
| 2012/0030293 A1* | 2/2012 | Bobotek | 709/206 |
| 2014/0018113 A1* | 1/2014 | Wosk et al. | 455/466 |

FOREIGN PATENT DOCUMENTS

EP        653868 A2 *  5/1995

* cited by examiner

*Primary Examiner* — Hassan Phillips
*Assistant Examiner* — Omeed D Rahgozar
(74) *Attorney, Agent, or Firm* — Holland & Hart LLP

(57) ABSTRACT

A computer-implemented method to determine a reputation of at least one telephone number associated with an unclassified source. A first device is monitored for an incoming contact originating from at least one unclassified source. When an incoming contact is detected, at least one attribute of the incoming contact is computed at the first device. The at least one attribute of the incoming contact is transmitted to a second device. A representation of the telephone number associated with the at least one unclassified source of the incoming contact is transmitted to the second device. The reputation of the telephone number is computed at the second device using the at least one attribute.

17 Claims, 7 Drawing Sheets

SYSTEMS AND METHODS FOR DETERMINING A REPUTATION OF AT LEAST ONE TELEPHONE NUMBER ASSOCIATED WITH AN UNCLASSIFIED SOURCE

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often requires human and computer interaction. Users of computer technologies continue to demand that the efficiency of these technologies increase. Improving the efficiency of computer technologies is important to anyone who uses and relies on computers.

Computing systems may be mobile so that users may carry these systems as they travel, shop, work, etc. Mobile computing systems may provide communication services to a user of a mobile computing system. For example, a mobile computing system that provides communication services may be a cellular telephone.

Users of telephones (either land line or cellular phones) often receive unwanted calls and messages. For example, telemarketing companies may call a telephone to attempt to sell products and/or services to a consumer. Procedures to block these unwanted contacts to land line phones do not carry over and block these unwanted contacts to cellular phones (or other types of mobile computing systems). As a result, benefits may be realized by providing systems and methods for determining a reputation of at least one telephone number associated with an unclassified source, and blocking incoming contacts at a mobile computing system based on the determined reputation of the telephone number associated with the incoming contact.

SUMMARY

According to at least one embodiment, a computer-implemented method to determine a reputation of at least one telephone number associated with an unclassified source is described. A first device is monitored for an incoming contact originating from at least one unclassified source. When an incoming contact is detected, at least one attribute of the incoming contact is computed at the first device. The at least one attribute of the incoming contact is transmitted to a second device. A representation of the telephone number associated with the at least one unclassified source of the incoming contact is transmitted to the second device. The reputation of the telephone number is computed at the second device using the at least one attribute.

In one embodiment, the telephone number may be added to a blacklist based on the computed reputation of the telephone number. In one configuration, the incoming contact may be an incoming call. In one example, the incoming contact may be an incoming short message service (SMS) message.

In one configuration, computing the at least one attribute of the incoming contact may include determining whether the incoming contact is rejected at the first device. In another embodiment, computing the at least one attribute of the incoming contact may include determining, when the incoming contact is not rejected, a length of contact between the first device and the at least one unclassified source. In addition, computing the at least one attribute of the incoming contact may include determining whether the first device has previously initiated contact with the at least one unclassified source.

In one example, a second incoming contact may be received at the first device from at least one unclassified source associated with a telephone number. A determination may be made as to whether the telephone number associated with the at least one unclassified source is included on a blacklist. The second incoming contact may be blocked at the first device when the telephone number is included on the blacklist. In one embodiment, the first device may be a mobile communications device. The representation of the telephone number may be one of the following: the actual telephone number, a hash of the telephone number, or a truncated version of the telephone number.

A computing device configured to determine at least one attribute of an incoming contact originating from an unclassified source is also described. The computing device may include a processor and memory in electronic communication with the processor. The computing device may further include a monitoring agent configured to monitor for an incoming contact originating from at least one unclassified source. When an incoming contact is detected, the monitoring agent may be configured to compute at least one attribute of the incoming contact, and transmit to a second device the at least one attribute of the incoming contact. The monitoring agent may be further configured to transmit to the second device a representation of a telephone number associated with the at least one unclassified source of the incoming contact.

A computing device configured to determine a reputation for a telephone number associated with an unclassified source is also described. The computing device may include a processor and memory in electronic communication with the processor. The computing device may further include a reputation generating module configured to receive a representation of the telephone number associated with the unclassified source that originated an incoming contact to a second computing device, and receive at least one attribute associated with the incoming contact. The reputation generating module may be further configured to compute a reputation for the telephone number using the at least one attribute associated with the incoming contact, and, based on the reputation, add the telephone number to a blacklist. In one embodiment, the reputation generating module may be further configured to detect a predetermined number of calls originating from the unclassified source and directed to a predetermined array of telephone numbers over a predetermined period of time.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
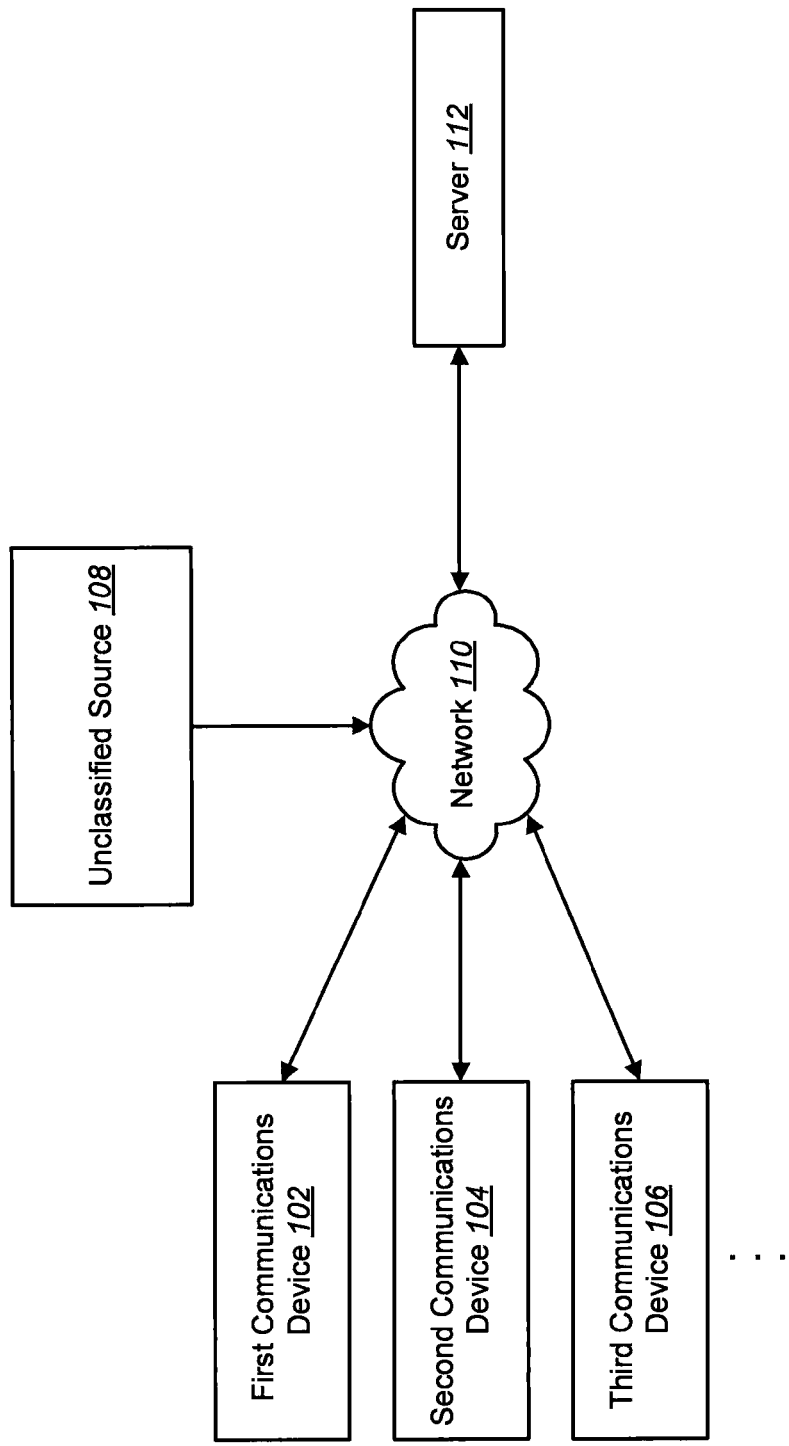
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Telemarketing has increasingly become one of the methods used by companies to directly market products and services to prospective customers. Telemarketing may include initiating an incoming call to a prospective customer's phone to solicit the customer to buy products or services. Telemarketing may include recorded sales pitches programmed to be played over the phone via automatic dialing. Telemarketing practices may be viewed by prospective customers as annoying and unwanted. For example, prospective customers may receive calls from telemarketers during the dinner hour, early in the morning, or late in the evening. In addition, telemarketing has been negatively associated with various scams and frauds, such as pyramid schemes, and with deceptively overpriced products and services.

In recent years, the user of mobile phones (i.e., cell phones) has dramatically increased. In many cases, consumers do not use a land line telephone and exclusively use their cell phone for communication purposes. As consumers continue to move from land line telephones to cell phones, unwanted telemarketing calls, scam calls, and fraudulent calls will continue to be a problem for cell phone users. In many cases, consumers would like to automatically have such unwanted phone calls blocked from reaching their cell phones in order to save on phone bills, reduce exposure to scams, save time, and the like.

The present systems and methods provide a reputation based system which has both device and cloud-based components. The present systems and methods may use incoming telemetry from numerous cell phones to compute a blacklist of phone numbers that should be blocked from sending an incoming call to cell phones in the future.

FIG. 1 is a block diagram illustrating one embodiment of an environment in which the present systems and methods may be implemented. In one configuration, an unclassified source 108 may attempt to initiate contact with at least one communications device 102, 104, 106. In one example, a communications device 102, 104, 106 may be a cell phone, a smart phone, a personal digital assistant (PDAs), a conventional telephone, and the like. In one example, the unclassified source 108 may attempt to initiate contact with at least one communications device 102, 104, 106 by initiating a telephone call to the at least one communications device 102, 104, 106. In another example, the unclassified source 108 may attempt to initiate contact with at least one communications device 102, 104, 106 by sending a short message service (SMS) message to the at least one device 102, 104, 106. The SMS message may be a text message, an SMS message that includes multi-media, and the like. While only three communications devices 102, 104, 106 are illustrated in FIG. 1, it is to be understood that more or less than three communications devices may be present in the present systems and methods. In addition, while only one unclassified source 108 is illustrated in FIG. 1, it is to be understood that more than one unclassified source 108 may be present in the present systems and methods.

In one configuration, communications between the communications devices 102, 104, 106 and the unclassified source 108 may occur via a network connection 110. In addition, the communications devices 102, 104, 106 may communicate with a server 112 across the network connection 110. The server 112 may be part of a service provider that provides communication services to the communications device 102, 104, 106. In one embodiment, each communications device 102, 104, 106 may send information about the unclassified source 108 to the server 112. In one example, the server 112 may determine whether the unclassified source 108 should be blocked or prevented from establishing contact with the communications devices 102, 104, 106.

Figure 2:
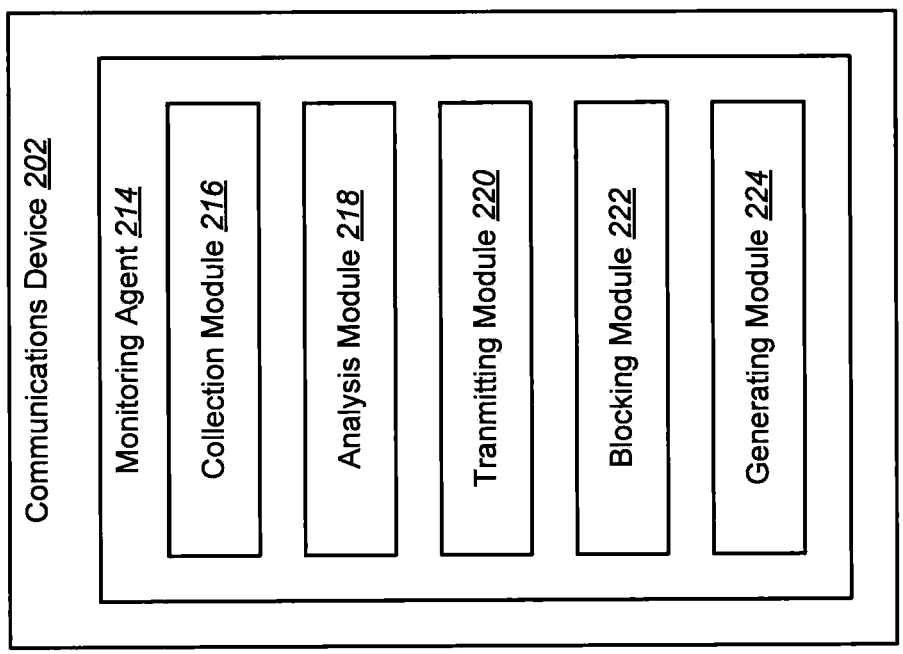
FIG. 2 is a block diagram illustrating one embodiment of a communications device.

FIG. 2 is a block diagram illustrating one embodiment of a communications device 202. In one example, the communications device 202 may include a monitoring agent 214. The monitoring agent 214 may monitor for all incoming contacts to the communications device 202. Incoming contacts may include, but are not limited to, incoming phone calls, incoming text messages, etc. In one example, the incoming contact may originate from the unclassified source 108.

In one example, the monitoring agent 214 may include a collection module 216, an analysis module 218, a transmitting module 220, a blocking module 222, and a generating module 224. In one configuration, the collection module 216 may collect or harvest representations of telephone numbers associated with each unclassified source that attempts to establish contact with the communications device 202 via an incoming contact (e.g., incoming phone call, incoming text message, and the like). Representations of telephone numbers may include, but are not limited to, the actual telephone numbers, a hash of the telephone number, or a truncated version of the telephone number. In one configuration, the communications device 202 may maintain a call log that includes the representation of the telephone number of each source (classified or unclassified) that has contacted the device 202. In one example, the collection module 216 may collect the representations of the telephone numbers for unclassified sources from call log application programming interfaces (APIs) of the communications device 202.

The analysis module 218 may analyze each representation of a telephone number collected by the collection module 216. In particular, the analysis module 218 may determine various attributes associated with the incoming contact originating from the unclassified source 108. For example, the analysis module 218 may determine whether an incoming contact (such as an incoming phone call) was rejected by a user of the communications device 202. In addition, if the incoming contact was not rejected, the analysis module 218 may determine the length of the contact between the unclassified source 108 and the communications device 202. Further, the analysis module may determine whether the user of the communications device 202 has ever initiated contact to a source associated with a phone number collected by the collection module 216 (and if so, how many times the user has initiated contact using the phone number). The analysis module 218 may further determine country of origin information associated with the incoming contact. In other words, the analysis module 218 may determine where the incoming contact was originated. In one configuration, the analysis module 218 may determine the time of day the incoming contact was originated and sent to the communications device 202. In addition, the analysis module 218 may determine whether the phone number of the unclassified source 108 that originated the incoming contact is included in an address book (or other type of contacts application) of the communications device 202.

The transmitting module 220 may transmit the data (the representation of the telephone number and attributes) to the server 112 associated with the service provider that provides communication services to the communications device 202. As previously stated, the transmitted representation of a telephone number may be a hash of the actual telephone number or may be a truncated version of the telephone number (i.e., one or more digits of the telephone number are removed to increase privacy).

In one embodiment, the blocking module 222 may access a blacklist that includes one or more phone numbers. The blocking module 222 may block any incoming contacts that originate from sources with phone numbers included on the blacklist. In one configuration, the generating module 224 may generate a report for the user that lists the phone numbers included on the blacklist. As a result, if a phone number is included on the blacklist that the user did not want blocked, the user may use the report to identify the mistakenly blocked phone numbers and remove the phone numbers from the blacklist. The report may be generated weekly, monthly, quarterly, yearly, or at any time desired by the user.

Figure 3:
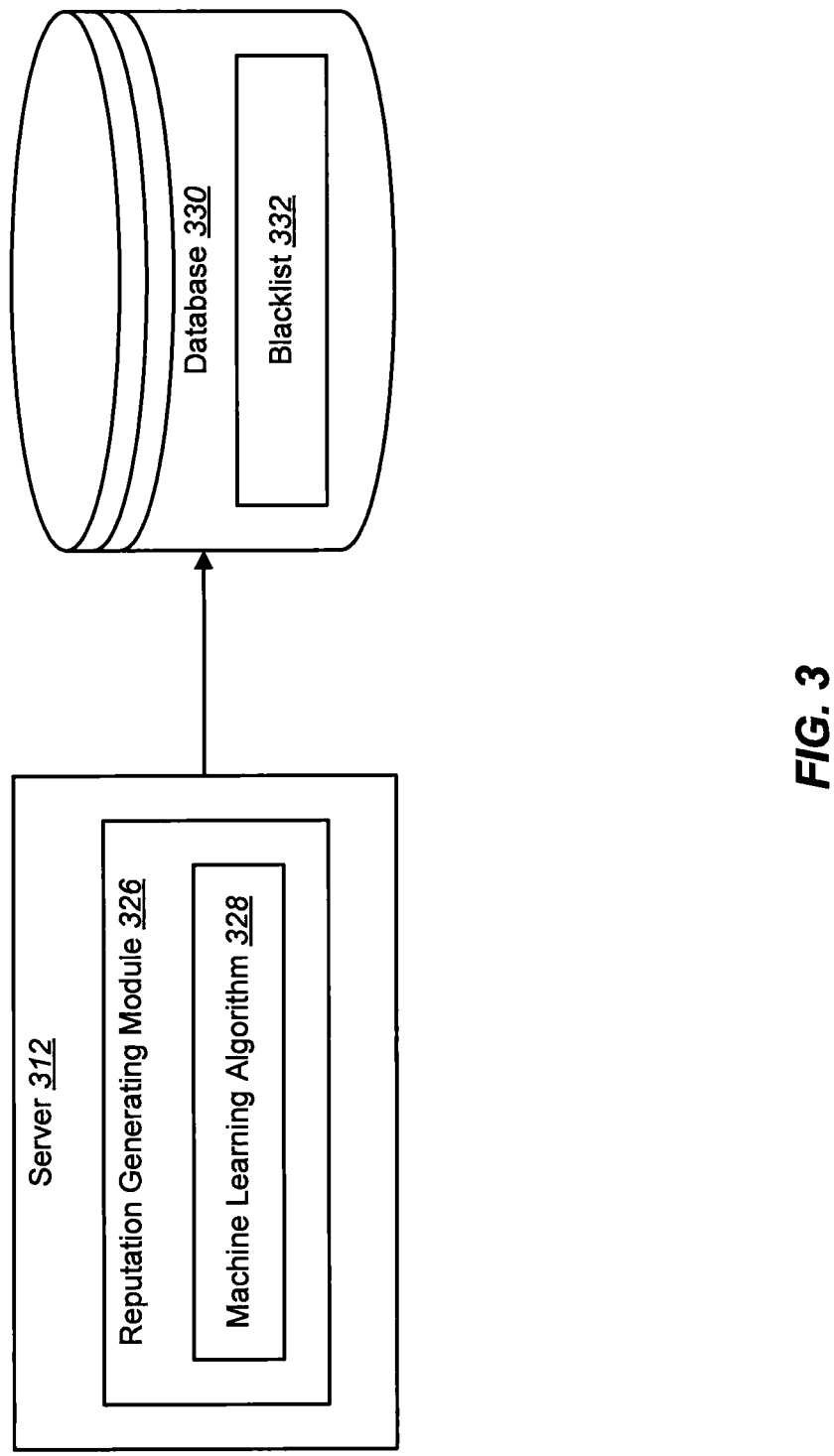
FIG. 3 is a block diagram illustrating one embodiment of a server.

FIG. 3 is a block diagram illustrating one embodiment of a server 312. In one configuration, the server 312 may be a back-end server for a service provider that provides communication capabilities for the communications devices 102, 104, 106.

In one example, the server 312 may include a reputation generating module 326. The reputation generating module 326 may generate a reputation for phone numbers received from a communications device 102, 104, 106. The reputation may be generated based on one or more attributes associated with each phone number, as explained above.

The reputation generating module 326 may generate the reputation via a machine learning algorithm 328. In one example, the machine learning algorithm 328 may analyze attributes associated with a phone number that have been received from a communications device 102, 104, 106. Examples of these attributes (as provided above) may include the average contact time between a communications device 102, 104, 106 and an unclassified source 108, the age of a phone number (the amount of times a particular phone number has been transmitted from a communications device 102, 104, 106), and the like. In one embodiment, phone numbers that are rarely dialed by users and have a short call time, or a high rate of rejections, may originate from unwanted sources, such as telemarketers. In addition, these phone numbers may be associated with scams and other fraudulent activities. Further the reputation generating module 326 may detect a large number of calls originating from a particular unclassified source to a wide array of phone numbers over a certain period of time. Such behavior from an unclassified source may be indicative of robot dialing and may be used by the reputation generating module 326 to identify unwanted callers. As a result, the phone numbers associated with these unclassified sources may receive a certain reputation score determined by the reputation generating module 326.

On the other hand, phone numbers that are associated with longer conversations or contact time between a communications device 102, 104, 106 and an unclassified source 108, might be identified as legitimate phone numbers. In addition, phone numbers associated with outbound calls, outbound text messages, etc. that originate from a user's communication device 102, 104, 106 might also be classified as legitimate phone numbers. As a result, these phone numbers might be assigned a certain reputation score determined by the reputation generating module 326.

In one embodiment, phone numbers with a certain reputation score may be added to a blacklist 332. In one example, a user may manually tag a phone number to add to the blacklist 332. In one configuration, the blacklist 332 may be transmitted to a communications devices 102, 104, 106. In another example, the blacklist 332 may be stored in a database 330 that is hosted by the server 312. In one embodiment, the monitoring agent 214 on the communications device 202 may consult or access the blacklist 332 and block incoming contacts to the communications device 202 that originate from a source associated with a phone number included on the blacklist 332.

Figure 4:
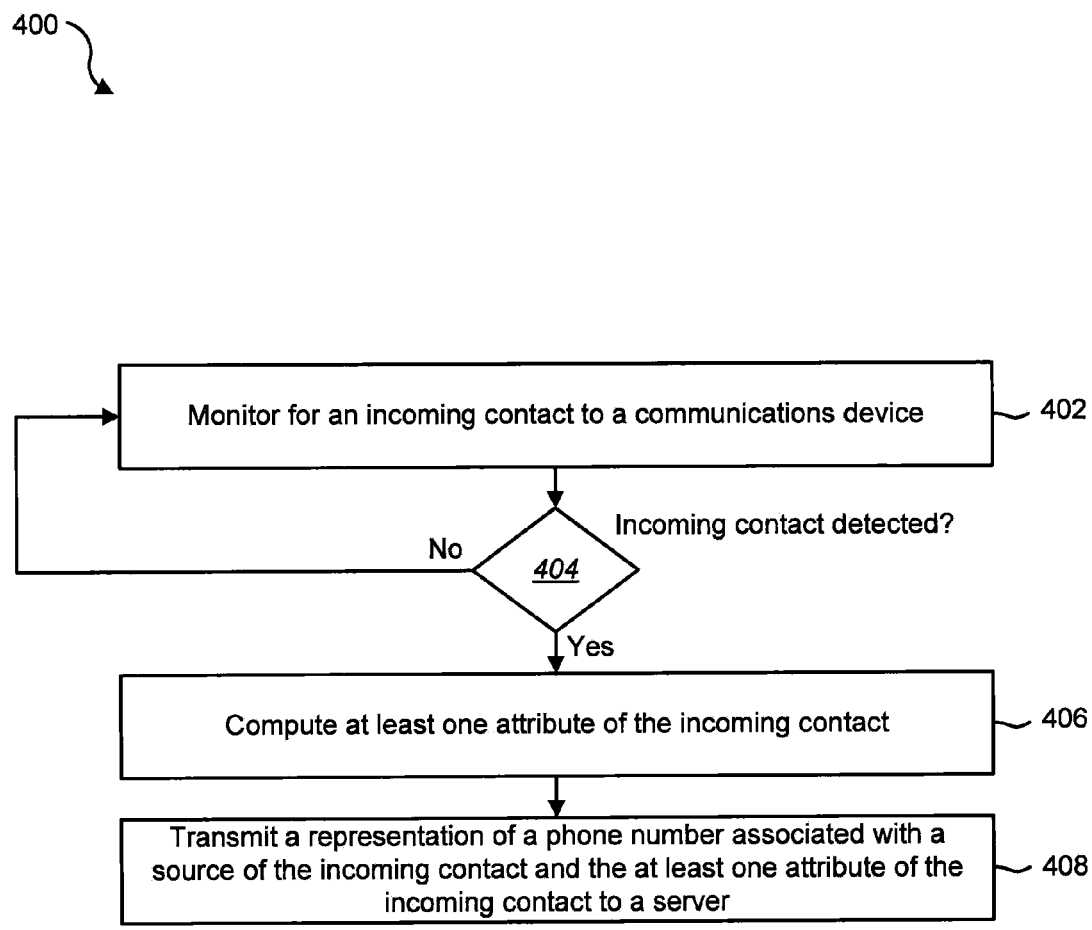
FIG. 4 is a flow diagram illustrating one embodiment of a method for determining at least one attribute of an incoming contact originating from an unclassified source associated with a phone number.

FIG. 4 is a flow diagram illustrating one embodiment of a method for determining at least one attribute of an incoming contact originating from an unclassified source associated with a phone number. In one embodiment the method 400 may be implemented by the monitoring agent 214.

In one example, a communications device may be monitored 402 for incoming contacts. Examples of incoming contacts may include an incoming telephone call, an incoming text message, and the like. A determination 404 may be made as to whether an incoming contact is detected. If it is determined 404 that an incoming contact has not been detected, the method 400 may return to continue to monitor 402 the communications device for an incoming contact. If, however, it is determined 404 that an incoming contact has been detected, at least one attribute of the incoming contact may be computed 406. A representation of a telephone number associated with a source of the incoming contact and the at least one attribute of the incoming contact may be transmitted 408 to a server.

Figure 5:
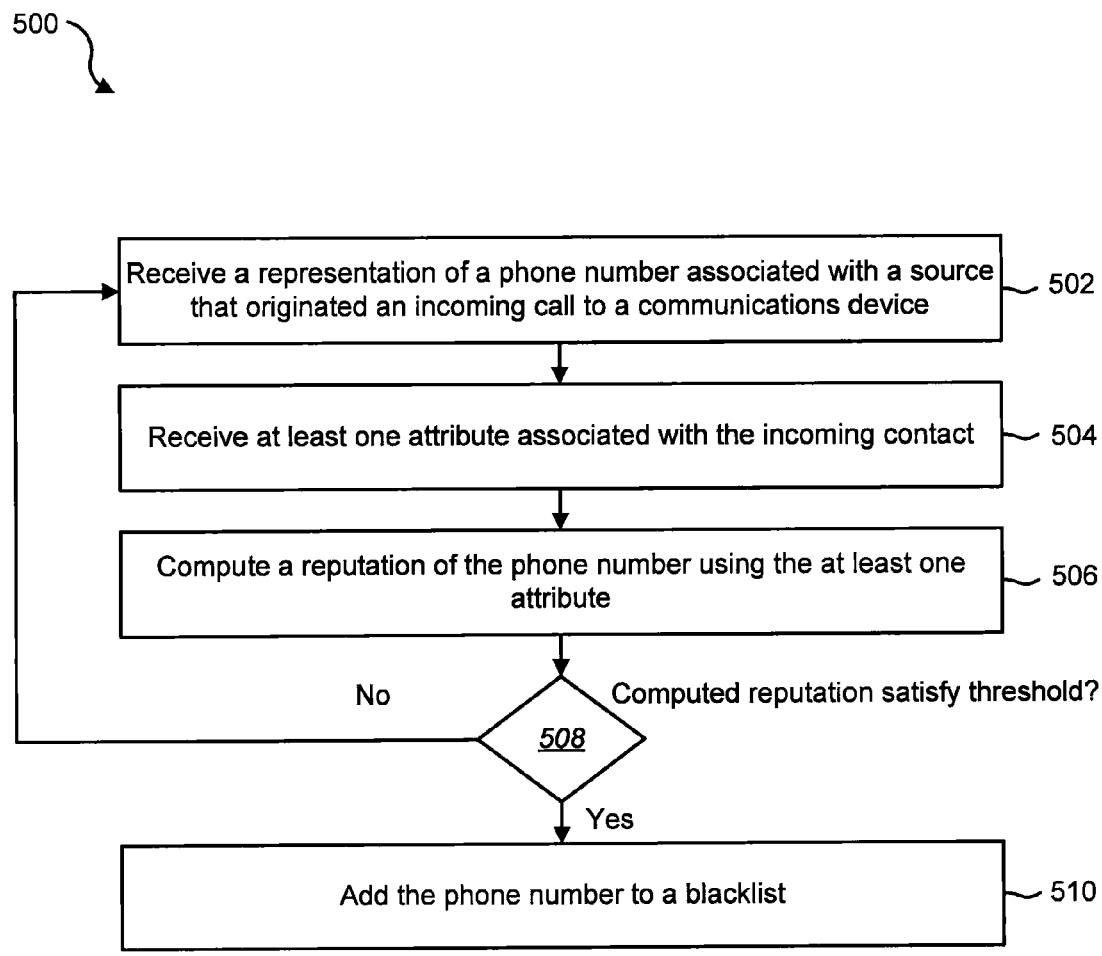
FIG. 5 is a flow diagram illustrating one embodiment of a method for calculating a reputation score of a phone number based on at least one attribute associated with the phone number.

FIG. 5 is a flow diagram illustrating one embodiment of a method 500 for calculating a reputation score of a phone number based on at least one attribute associated with the phone number. In one embodiment, the method 500 may be implemented by the reputation generating module 326.

In one example, a representation of a telephone number associated with the source that originated an incoming contact to a communications device may be received 502. In addition, at least one attribute associated with the incoming contact may also be received 504. The at least one attribute may be determined by analyzing the incoming contact. A reputation score for the phone number may be computed 506 using the at least one attribute. A determination 508 may be made as to whether the computed reputation score satisfies a threshold. If it is determined 508 that the computed reputation does not satisfy the threshold, the method 500 may return to receive 502 a phone number associated with the source that originated in an incoming call to the communications device. If, however, it is determined 508 that the computed reputation does satisfy the threshold, the phone number may be added 510 to a blacklist. For example, a phone number may be added to the blacklist 332 if a minimum number of communication devices 102, 104, 106 have transmitted the phone number to the server 112. In addition, a phone number may be added to the blacklist 332 if the incoming contact originating from the source associated with the phone number is rejected by a minimum number of communications devices 102, 104, 106.

Figure 6:
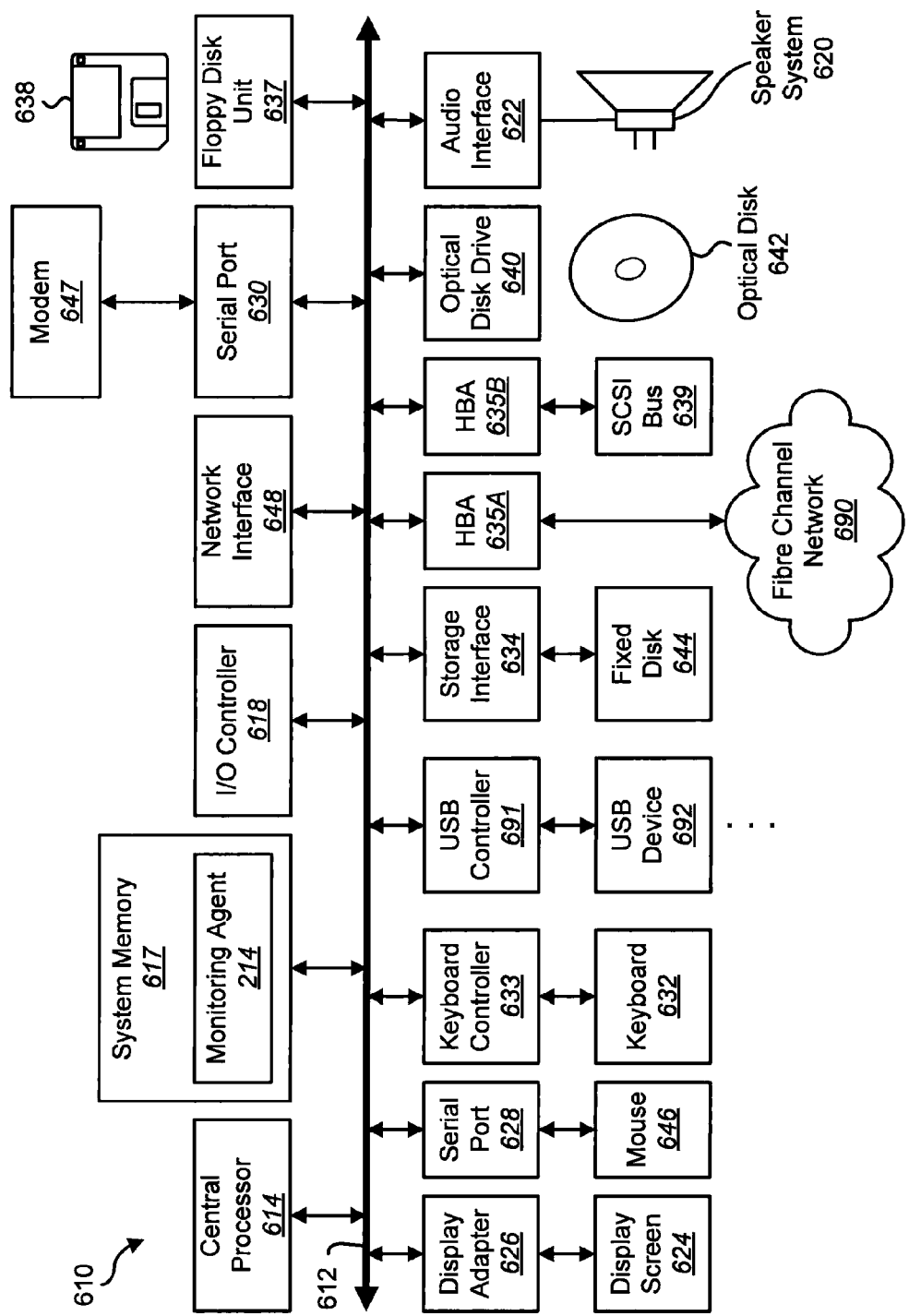
FIG. 6 depicts a block diagram of a computer system 610 suitable for implementing the present systems and methods.

FIG. 6 depicts a block diagram of a computer system 610 suitable for implementing the present systems and methods. Computer system 610 includes a bus 612 which interconnects major subsystems of computer system 610, such as a central processor 614, a system memory 617 (typically RAM, but which may also include ROM, flash RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), multiple USB devices 692 (interfaced with a USB controller 690), a storage interface 634, a floppy disk drive 637 operative to receive a floppy disk 638, a host bus adapter (HBA) interface card 635A operative to connect with a Fibre Channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the monitoring agent 214 to implement the present systems and methods may be stored within the system memory 617. Applications resident with computer system 610 are generally stored on and accessed via a computer readable medium, such as a hard disk drive (e.g., fixed disk 644), an optical drive (e.g., optical drive 640), a floppy disk unit 637, or other storage medium. Additionally, applications can be in the form of electronic signals modulated in accordance with the application and data communication technology when accessed via network modem 647 or interface 648.

Storage interface 634, as with the other storage interfaces of computer system 610, can connect to a standard computer readable medium for storage and/or retrieval of information, such as a fixed disk drive 644. Fixed disk drive 644 may be a part of computer system 610 or may be separate and accessed through other interface systems. Modem 647 may provide a direct connection to a remote server via a telephone link or to the Internet via an internet service provider (ISP). Network interface 648 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 6 need not be present to practice the present systems and methods. The devices and subsystems can be interconnected in different ways from that shown in FIG. 6. The operation of a computer system such as that shown in FIG. 6 is readily known in the art and is not discussed in detail in this application. Code to implement the present disclosure can be stored in computer-readable medium such as one or more of system memory 617, fixed disk 644, optical disk 642, or floppy disk 638. The operating system provided on computer system 610 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 7:
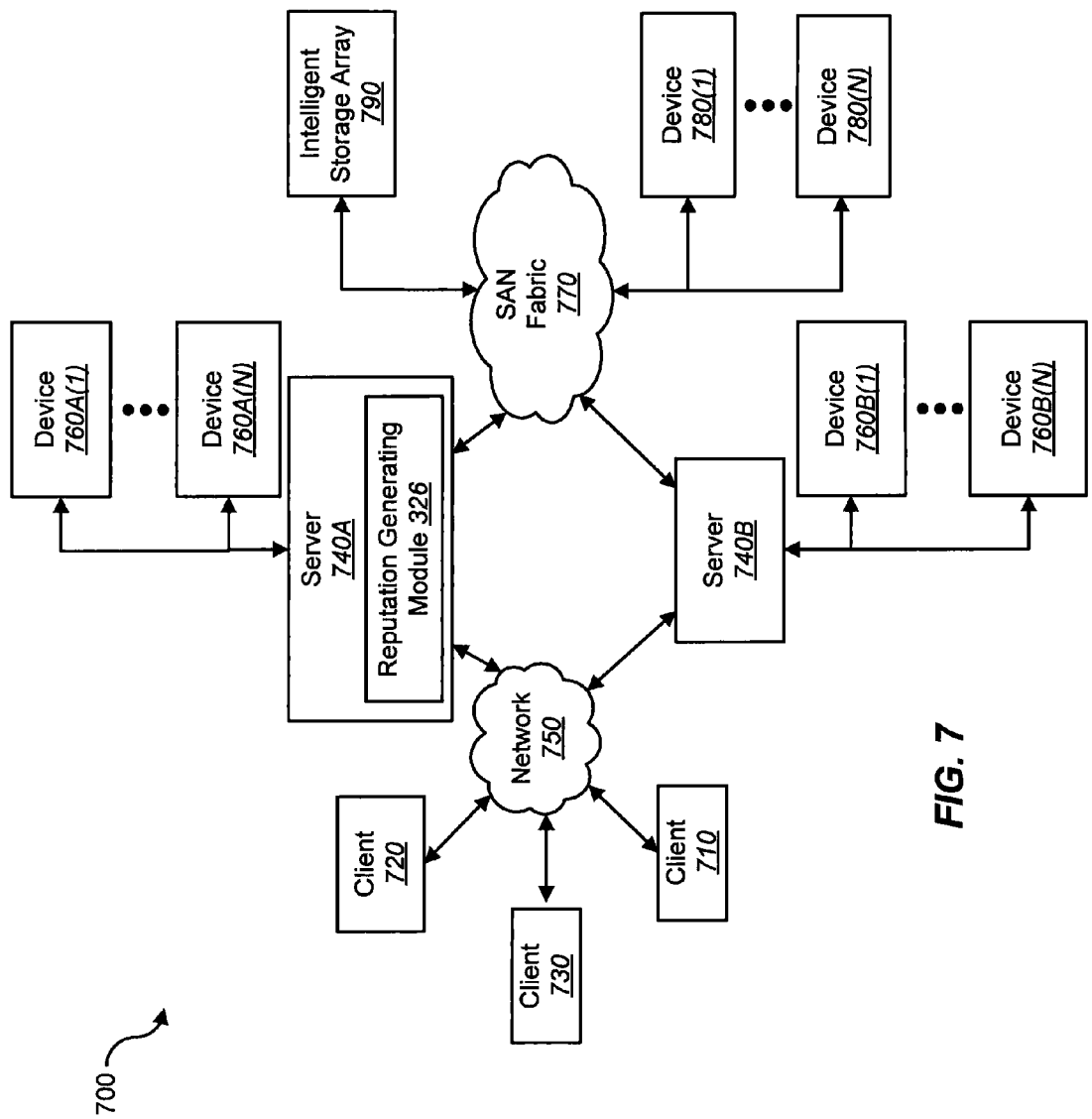
FIG. 7 is a block diagram depicting a network architecture in which client systems, as well as storage servers (any of which can be implemented using computer system), are coupled to a network.

FIG. 7 is a block diagram depicting a network architecture 700 in which client systems 710, 720 and 730, as well as storage servers 740A and 740B (any of which can be implemented using computer system 710), are coupled to a network 750. In one embodiment, the reputation generating module 326 may be located within a server 740A, 740B to implement the present systems and methods. The storage server 740A is further depicted as having storage devices 760A(1)-(N) directly attached, and storage server 740B is depicted with storage devices 760B(1)-(N) directly attached. SAN fabric 770 supports access to storage devices 780(1)-(N) by storage servers 740A and 740B, and so by client systems 710, 720 and 730 via network 750. Intelligent storage array 790 is also shown as an example of a specific storage device accessible via SAN fabric 770.

With reference to computer system 610, modem 647, network interface 648 or some other method can be used to provide connectivity from each of client computer systems 710, 720, and 730 to network 750. Client systems 710, 720, and 730 are able to access information on storage server 740A or 740B using, for example, a web browser or other client software (not shown). Such a client allows client systems 710, 720, and 730 to access data hosted by storage server 740A or 740B or one of storage devices 760A(1)-(N), 760B(1)-(N), 780(1)-(N) or intelligent storage array 790. FIG. 7 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method to determine a reputation of at least one telephone number associated with an unclassified source, comprising:
    monitoring, by a processor of a smartphone, for incoming contacts to the smartphone, the incoming contacts comprising telephone calls and text messages originating from at least one unclassified source;
    upon detecting, by the processor, an incoming contact to the smartphone originating from an unclassified source, determining, by the processor, at least one attribute of the incoming contact, wherein the at least one attribute comprises the telephone number of the unclassified source and a result of the smartphone determining whether the smartphone has previously initiated a telephone call or a text message to the unclassified source;
    transmitting, by the processor, the at least one attribute of the incoming contact to a server, wherein the server computes a reputation of the unclassified source based on the at least one attribute of the incoming contact and shares the reputation with the smartphone and one or more other smartphones;
    receiving from the server, via the processor, the reputation of the telephone number determined by the server analyzing the at least one attribute, wherein the server identifies the telephone number of the unclassified source as a legitimate telephone number when the result indicates the smartphone has previously initiated a telephone call or a text message to the unclassified source;
    wherein the telephone number of the unclassified source is added to a blacklist when the server receives information indicating contact with the unclassified source is rejected by a predetermined number of smartphones; and
    wherein computing the at least one attribute of the incoming contact comprises determining, when the incoming contact is not rejected, a length of contact between the smartphone and the at least one unclassified source.

2. The method of claim 1, further comprising adding the telephone number to a blacklist based on the computed reputation of the telephone number.

3. The method of claim 1, wherein the incoming contact comprises an incoming call.

4. The method of claim 1, wherein the incoming contact comprises an incoming short message service (SMS) message.

5. The method of claim 1, wherein computing the at least one attribute of the incoming contact comprises determining whether the incoming contact is rejected at the smartphone.

6. The method of claim 1, further comprising receiving, at the smartphone, a second incoming contact from at least one unclassified source associated with a telephone number.

7. The method of claim 6, further comprising determining whether the telephone number associated with the at least one unclassified source is included on a blacklist.

8. The method of claim 7, further comprising blocking the second incoming contact, at the smartphone, when the telephone number is included on the blacklist.

9. The method of claim 1, wherein the representation of the telephone number comprises one of the following: the telephone number, a hash of the telephone number, or a truncated version of the telephone number.

10. A computing device configured to determine at least one attribute of an incoming contact originating from an unclassified source, comprising:
    a processor of a smartphone;
    memory in electronic communication with the processor;
    instructions stored in the memory, the instructions being executable by the processor to:
        monitor for incoming contacts to the smartphone, the incoming contacts comprising telephone calls and text messages originating from at least one unclassified source;
        upon detecting an incoming contact to the smartphone originating from an unclassified source, determine at least one attribute of the incoming contact, wherein the at least one attribute comprises the telephone number of the unclassified source and a result of the smartphone determining whether the smartphone has previously initiated a telephone call or a text message to the unclassified source;
        transmit the at least one attribute of the incoming contact to a server, wherein the server computes a reputation of the unclassified source based on the at least one attribute of the incoming contact;

receive from the server the reputation of the telephone number determined by the server analyzing the at least one attribute, wherein the server identifies the telephone number of the unclassified source as a legitimate telephone number when the result indicates the smartphone has previously initiated a telephone call or a text message to the unclassified source;

wherein the telephone number of the unclassified source is added to a blacklist when the server receives information indicating contact with the unclassified source is rejected by a predetermined number of smartphones; and wherein computing the at least one attribute of the incoming contact comprises determining, when the incoming contact is not rejected, a length of contact between the smartphone and the at least one unclassified source.

11. The computing device of claim 10, wherein the incoming contact comprises an incoming call.

12. The computing device of claim 10, wherein the incoming contact comprises an incoming short message service (SMS) message.

13. The computing device of claim 10, wherein the instructions to compute the at least one attribute of the incoming contact are executable by the processor to:

determine whether the incoming contact is rejected at the first user device.

14. The computing device of claim 10, wherein the instructions are executable by the processor to:

receive a second incoming contact from at least one unclassified source associated with a telephone number;

determine whether the telephone number associated with the at least one unclassified source is included on a blacklist; and block the second incoming contact when the telephone number is included on the blacklist.

15. The computing device of claim 10, wherein the representation of the telephone number comprises one of the following: the telephone number, a hash of the telephone number, or a truncated version of the telephone number.

16. A computing device configured to determine a reputation for a telephone number associated with an unclassified source, comprising:

a processor of a smartphone;
memory in electronic communication with the processor;
instructions stored in the memory, the instructions being executable by the processor to:

monitor for incoming contacts to the smartphone, the incoming contacts comprising telephone calls and text messages originating from at least one unclassified source;

upon detecting an incoming contact to the smartphone originating from an unclassified source, determine at least one attribute of the incoming contact, wherein the at least one attribute comprises the telephone number of the unclassified source and a result of the smartphone determining whether the smartphone has previously initiated a telephone call or a text message to the unclassified source;

transmit the at least one attribute of the incoming contact to a server, wherein the server computes the reputation for the telephone number associated with the unclassified source using the at least one attribute associated with the incoming contact;

receive from the server the reputation of the telephone number determined by the server analyzing the at least one attribute, wherein the server identifies the telephone number of the unclassified source as a legitimate telephone number when the result indicates the smartphone has previously initiated a telephone call or a text message to the unclassified source;

wherein the telephone number of the unclassified source is added to a blacklist when the server receives information indicating contact with the unclassified source is rejected by a predetermined number of smartphones; and wherein computing the at least one attribute of the incoming contact comprises determining, when the incoming contact is not rejected, a length of contact between the smartphone and the at least one unclassified source.

17. The computing device of claim 16, wherein the instructions are executable by the processor to:

detect a predetermined number of calls originating from the unclassified source that are directed to a predetermined array of telephone numbers over a predetermined period of time.

* * * * *